US006357340B1

(12) United States Patent
Kato et al.

(10) Patent No.: US 6,357,340 B1
(45) Date of Patent: Mar. 19, 2002

(54) PISTON COMPRESSOR PISTON

(75) Inventors: Takayuki Kato; Takahiro Sugioka; Shigeo Fukushima, all of Kariya (JP); Jiro Yamashita, Wiesbaden (DE); Tetsuji Yamaguchi, Kanagawa-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/506,788

(22) Filed: Feb. 18, 2000

(30) Foreign Application Priority Data

Feb. 26, 1999 (JP) .......................................... 11-051688

(51) Int. Cl.[7] .............................. F01B 31/10; F16J 9/00
(52) U.S. Cl. ........................................... 92/155; 92/248
(58) Field of Search ........................... 92/155, 172, 248

(56) References Cited

U.S. PATENT DOCUMENTS 3,935,797 A * 2/1976 Niimi et al. .................. 92/223
4,250,953 A * 2/1981 Bush ..................... 92/169.1 X
4,516,479 A * 5/1985 Vadasz .................. 92/170.1 X
4,882,215 A * 11/1989 Ushio et al. ................ 428/143
5,063,894 A * 11/1991 Mielke et al. ............ 92/222 X
5,430,938 A * 7/1995 Rao et al. .............. 29/888.074
5,482,637 A * 1/1996 Rao et al. ...................... 252/29
5,486,299 A * 1/1996 Fuwa et al. .................... 252/12
5,655,432 A * 8/1997 Wilkosz et al. ................ 92/71
5,700,093 A * 12/1997 Hiramatsu et al. .......... 384/276
5,941,161 A * 8/1999 Kimura et al. ................ 92/155
5,996,467 A * 12/1999 Churgay et al. ............... 92/71

FOREIGN PATENT DOCUMENTS

EP 0 818 625 A2 * 1/1998
JP A-09256952 9/1997
JP A-10026081 1/1998
JP A-10169557 6/1998
JP A-10299654 11/1998

* cited by examiner

*Primary Examiner*—John E. Ryznic
(74) *Attorney, Agent, or Firm*—Woodcock Washburn LLP

(57) ABSTRACT

A coat layer formed on the outer perimeter side surface of a piston comprises a fluorocarbon resin and a binder as main components, and further contains 0.05–12% by volume of a wear resistance additive with a Mohs hardness of 2.0–5.0. This provides a piston compressor piston having a coat layer with excellent wear resistance.

9 Claims, 3 Drawing Sheets

PISTON COMPRESSOR PISTON

BACKGROUND OF THE INVENTION

1. Field of the Invention

The present invention relates to a piston for a compressor used, for example, in a vehicle air-conditioning system.

2. Description of the Related Art

Piston compressors are one type of compressor used in vehicle air-conditioning systems. Some of the pistons in such compressors are constructed with no piston ring, so that the outer perimeter side surface of the piston directly contacts the inner perimeter side surface of the cylinder bore. For pistons with this type of construction, it is necessary to guarantee sliding properties, seal properties and wear resistance between the outer perimeter side surface of the piston and the inner perimeter side surface of the cylinder bore, since no piston ring is provided.

It has been conventional to form a coat layer composed mainly of a fluorocarbon resin or the like on the outer perimeter side surface of the piston, in order to guarantee these sliding properties, seal properties and wear resistance (see, for example, Japanese Unexamined Patent Publication (Kokai) Nos. 9-256952, 10-26081, 10-169557 and 10-299654).

However, with the pistons of such conventional piston compressors that have a coat layer formed of a coating material composed mainly of a fluorocarbon resin, a problem has existed in that the wear resistance of the coat layer is not always satisfactory.

BRIEF SUMMARY OF THE INVENTION

The present invention has been accomplished in light of these existent problems of the prior art, and its object is to provide a piston compressor piston that has a coat layer with excellent wear resistance.

The piston compressor piston according to the invention is a piston compressor piston having a coat layer provided on the outer perimeter side surface of the piston, which coat layer comprises a fluorocarbon resin and a binder at 50–400 parts by weight per 100 parts by weight of the fluorocarbon resin, and further contains a wear resistance additive with a Mohs hardness in a range of 2.0–5.0 at 0.05–12% by volume based on the fluorocarbon resin.

DETAILED DESCRIPTION OF THE INVENTION

Figure 1:
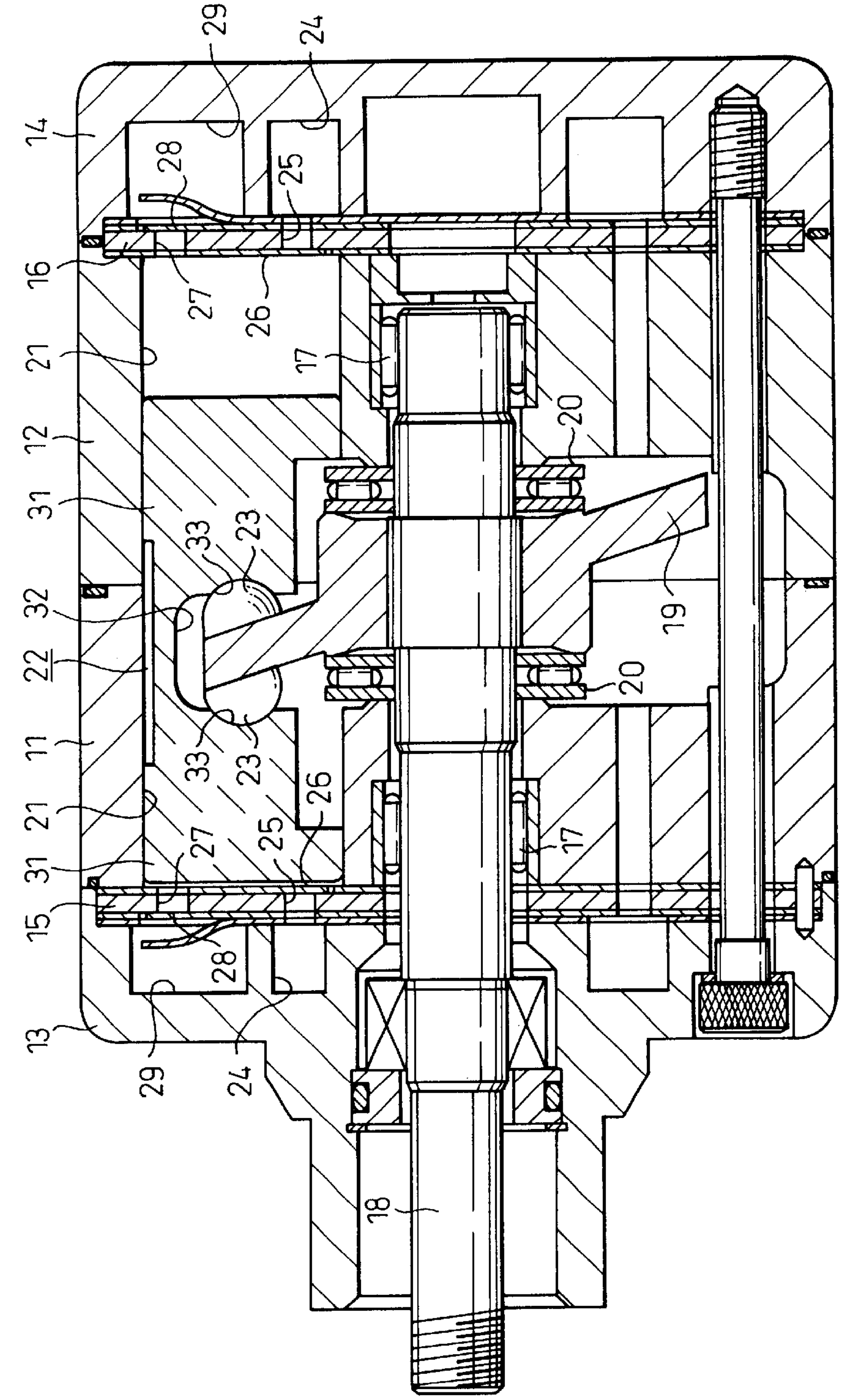
FIG. 1 is a longitudinal cross-sectional view of a compressor.

The coat layer provided on the outer perimeter side surface of the piston compressor piston of the invention is formed by coating the outer perimeter side surface of a piston compressor piston with a coating solution obtained by dissolving in an organic solvent 100 parts by weight of a fluorocarbon resin, 50–400 parts by weight of a binder, and a wear resistance additive with a Mohs hardness in the range of 2.0–5.0 at 0.05–12% by volume based on the fluorocarbon resin, and then removing the organic solvent by a method such as drying. The coat layer may also contain other desired additives by adding them to the coating solution up to about a few dozen percent if desired, so long as they do not impede the effect of the invention. As examples of such additives there may be mentioned pigments and dyes.

According to the invention, the thickness of the coat layer provided on the outer perimeter side surface of the piston compressor piston may be any desired thickness suitable for the conditions and purpose of use for the piston compressor, but it is usually 20–60 μm.

The wear resistance additive used for the invention is a mineral, inorganic substance or inorganic compound with a Mohs hardness in the range of 2.0–5.0, and one with a property allowing uniform dispersion in the coat layer may be used. Specifically, it may consist of a powder, fine particles or a fine particulate substance. If the Mohs hardness of the wear resistance additive is less than 2 the wear resistance is inadequately exhibited, while if the Mohs hardness is over 5, it will tend to scratch the sliding surface in contact with the coat layer surface.

The wear resistance additive having a Mohs hardness within the above-mentioned range is used in the coat layer in a range of 0.05–12% by volume based on the fluorocarbon resin content. Below this range, the wear resistance is inadequately exhibited, while at above this range it will tend to scratch the sliding surface in contact with the coat layer surface. From the standpoint of wear resistance, the Mohs hardness of the wear resistance additive is more preferably in the range of 2.5–4.5, and even more preferably 3.0–4.0. The Mohs hardness is a characteristic value inherent in each wear resistance additive. According to the invention, the wear resistance additive used is a mineral, inorganic substance or inorganic compound with a Mohs hardness in this range, which has been processed by crushing or the like to the form described above (powder, fine particles, etc.).

The wear resistance additive used usually has a mean particle size of no greater than 10 μm. If the mean particle size exceeds 10 μm, it may not be possible to achieve a smooth coated surface and the practical utility may thus be reduced.

As specific wear resistance additives there may be mentioned calcium fluoride, zinc oxide, mica, aluminum hydroxide, boron nitride, calcium carbonate, calcium triphosphate, barium sulfate and the like, but there is no limitation to these.

Wear resistance additives with solid lubricating properties are preferably selected. An example that may be mentioned is calcium fluoride.

As fluorocarbon resins there may be mentioned PTFE (polytetrafluoroethylene), ETFE (ethylenetetrafluoroethylene) and FEP (tetrafluoroethylene-hexafluoropropylene copolymer), but there is no limitation to these. The fluorocarbon resin used for the invention is usually in the form of a powder or a powdery substance. Such fluorocarbon resins are widely available, and for example, polytetrafluoroethylene is commercially available under the trade names Hostaflon TF (Hoechst Industries, Inc.) and Cephral Loop (Central Glass Co., Ltd.). The binder used is usually a thermosetting resin with high heat resistance. As examples there may be mentioned polyamide-imide resins, polyamide resins, epoxy resins, phenol resins and the like, but there is no limitation to these.

In most cases, these resins are sold in a form diluted with a solvent, and such commercial products may also be applied for the present invention. When such solvent-diluted products are applied for the invention, the solid portion (resin component) serves as the binder for the invention. For example, polyamide-imide resins are sold under the trade name of the HPC Series (Hitachi Chemical Co., Ltd.).

The proportion of the solvent in the coating solution is not especially restricted so long as it is sufficient to uniformly disperse or dissolve the binder, fluorocarbon resin and wear resistance additive, to produce a condition suitable for application and other operations. The amount of solvent used may be selected as desired, although the solvent is usually used at about 100 parts by weight per 100 parts of the total weight of the other components.

Figure 4:
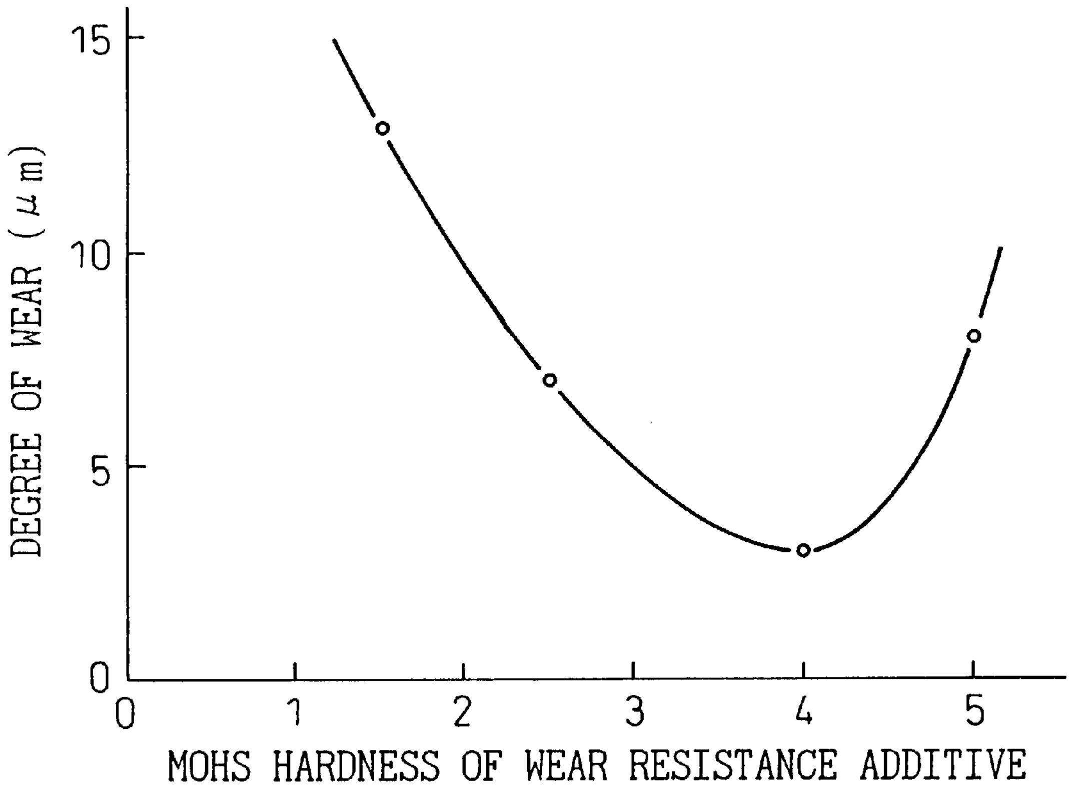
FIG. 4 is a graph showing the relationship between Mohs hardness and abrasive wear.

According to the invention of claim 1, it is possible to improve the wear resistance of the coat layer with a wear resistance additive. FIG. 4 shows the results obtained when coat layers containing a wear resistance additive were formed on pistons, and the abrasion wear of the coat layers was measured after operating piston compressors with the pistons under specific conditions. The coat layers containing wear resistance additives with Mohs hardnesses of 2.0–5.0 have less abrasion wear and more excellent wear resistance compared to a coat layer without the aforementioned abrasion resistance additive. In contrast, when the coat layer contains the wear resistance additive with a Mohs hardness value below the range prescribed above, the wear resistance is notably reduced. Conversely, when the Mohs hardness value exceeds the aforementioned range, greater wear occurs on the inner perimeter side surface of the cylinder bore in contact with the coat layer.

According to the invention of claim 2, the improvement in wear resistance is satisfactory.

According to the invention of claim 3, the improvement in wear resistance is even more satisfactory.

According to the invention of claim 4, the wear resistance is most satisfactory.

According to the invention of claim 5, the solid lubricating property of the additive reduces the sliding resistance on the piston, thus allowing satisfactory sliding properties.

According to the invention of claim 6, the use of calcium fluoride, which exhibits a high level of both Mohs hardness and solid lubricating property, can provide very suitable wear resistance and sliding properties.

According to the invention of claim 7, the effect of claim 6 can be more satisfactorily maintained.

Concrete embodiments of the invention will now be explained.

Figure 2:
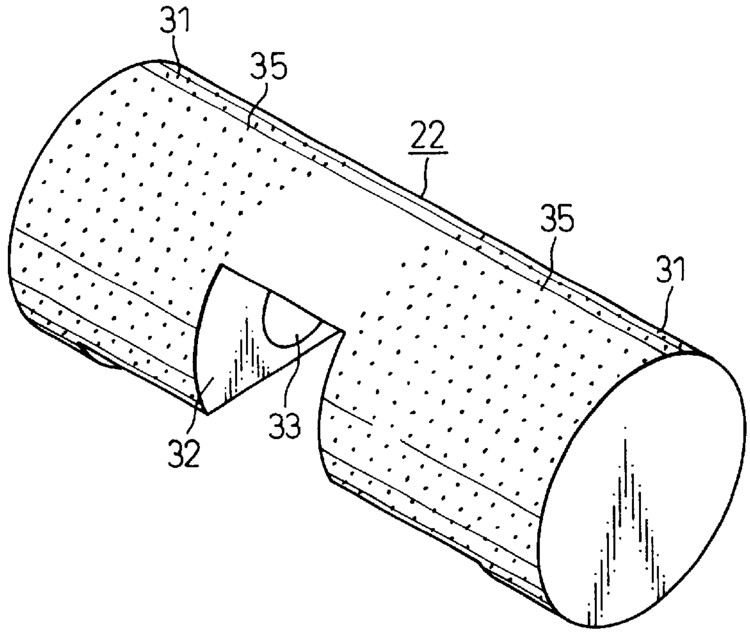
FIG. 2 is a perspective view of a piston.
Figure 3:
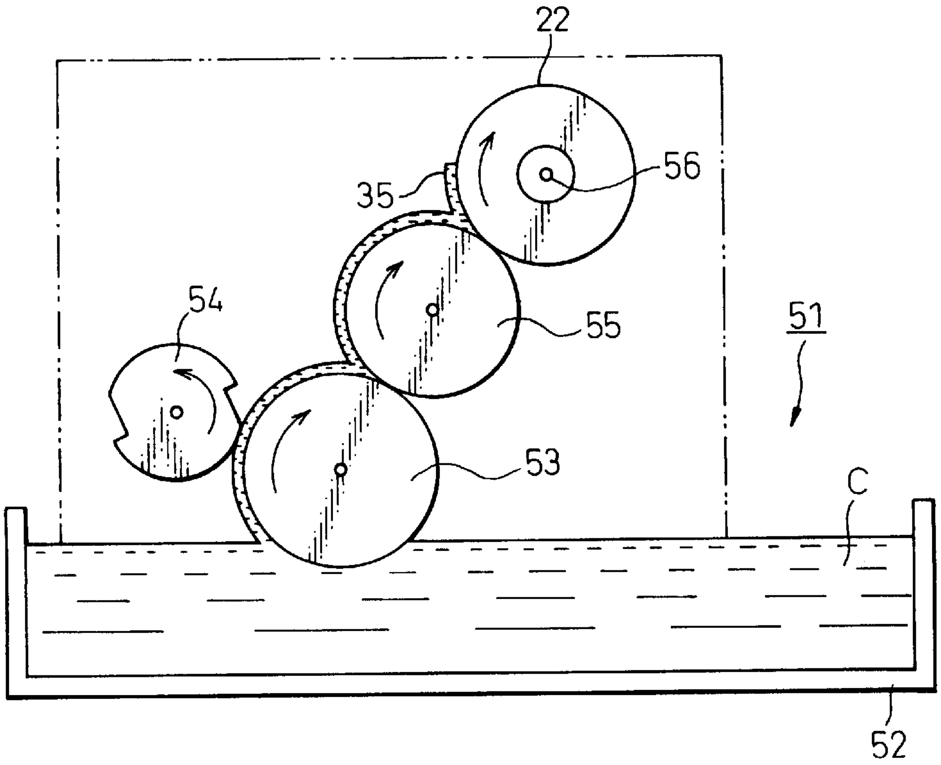
FIG. 3 is a schematic view of a roll coating apparatus.

FIGS. 1 to 3 show concrete embodiments of the double-head piston of a double-head piston compressor, according to the invention.

Center housings 11, 12 are fixed together, and a front housing 13 and rear housing 14 are fixed in front and behind via separate valve plates 15, 16. The center housings 11, 12 and the front housing 13 and rear housing 14 are made of an aluminum alloy. A driving shaft 18 is supported in a rotatable manner between the two center housings 11, 12 via a radial bearing 17. A swash plate 19 is fixed at the middle section of the driving shaft 18, and the swash plate 19 is supported on the front housing 13 and rear housing 14 by thrust bearings 20.

On the front housing 13 and rear housing 14 there are formed a series of cylinder bores 21 at equal spacing on the same circle, each centered around the axis of the driving shaft 18. The piston 22 is housed between the front and rear opposing cylinder bores 21 in a manner allowing reciprocating motion, and the outer perimeter of the swash plate 19 is linked to an intermediate section thereof via shoes 23. The piston 22 is made of an aluminum alloy.

When the driving shaft 11 is rotated, the swash plate 19 is pivotally rotated together therewith, and this pivotal rotation causes the piston 22 to move reciprocally. Refrigerant gas is thus drawn into the cylinder bore 21 through a suction port 25 and a suction valve 26 from a suction chamber 24 connected to an external refrigerating circuit (not shown). The refrigerant gas is compressed and discharged into a discharge chamber 29 through a discharge port and discharge valve 28, and sent from the discharge chamber 29 to an external refrigerant circuit.

Regarding the structure of the piston 22, as shown in FIG. 2, this piston 22 is an iron foundry product in the overall shape of a cylinder. The piston 22 has one of its cylindrical heads 31 inserted into the cylinder bore 21 at the front, while the other cylindrical head 31 is inserted into the cylinder bore 21 at the rear. An recess 32 is formed by removing a part near the center section between both heads 31. A shoe seat 33 functioning as a receiver to receive the shoe 23 is formed in this recess 32. The shoe is received in the shoe seat 33.

A coat layer 35 composed mainly of a fluorocarbon resin and a binder is formed as a coating a few dozen μm in thickness on the outer perimeter side surfaces of both heads 31, as the sliding sections for the cylinder bore 21. It is thereby possible to ensure seal properties, low-friction sliding properties and wear resistance between the outer perimeter side surface of the piston 22 and the inner perimeter side surface of the cylinder bore 21.

The weight ratio of the fluorocarbon resin and the binder in the coat layer 35 is 50–400 parts by weight of the binder per 100 parts by weight of the fluorocarbon resin. The coat layer 35 contains calcium fluoride with a mean particle size of 5 μm, as the wear resistance additive, at 0.1% by volume based on the fluorine resin. The calcium fluoride has a Mohs hardness of 4.0, and possesses a solid lubricating property.

Incidentally, the coat layer 35 is formed with a roll coating apparatus 51 such as shown in FIG. 3. The roll coating apparatus 51 is provided with a material pan 52 storing a coating material C, a metal roll 53 of which a part of the outer perimeter portion is immersed in the coating material C of the material pan 52, a comma roll 54 situated at a prescribed spacing from the metal roll 53, a synthetic rubber transfer roll 55 situated in contact with the metal roll 53, a work holder 56 that holds a piston 22 in a rotatable manner, and a driving mechanism (not shown) with a motor that rotates the work holder 56 and each of the rolls 53–55 in the directions of their respective arrows.

When the driving mechanism is activated to rotate the rolls 53–55 and the piston 22, the coating material C in the material pan 52 continuously adheres to the outer perimeter side surface of the metal roll 53 in the direction of its circumference. After the film thickness of the coating material C adhered to the metal roll 53 has been modified by the comma roll 54, it is transferred to the transfer roll 55 in contact therewith. The coating material C is transfer-coated onto the head 31 of the piston 22 that is in contact with the transfer roll 55. Once the piston 22 has been coated with the coating material C, it is subjected to drying and curing to form a coat layer 35.

Because the piston 22 having this construction has a coat layer 35 containing calcium fluoride, it exhibits the following effect.

The solid lubricating property of the calcium fluoride reduces the frictional resistance between the inner perimeter side of the cylinder bore 21 and the coat layer 35. The sliding properties of the piston 22 are therefore improved, providing increased operating efficiency for the compressor. Even better sliding properties are provided if the mean particle size of the calcium fluoride is no greater than 10 μm, and preferably 1–5 μm.

Because the coat layer 35 contains calcium fluoride with a hardness roughly equivalent to the center housings 11, 12 forming the cylinder bore 21, there is a drastic improvement in wear resistance of the coat layer 35, as shown in FIG. 4. Consequently, a high sealing property can be maintained for long periods, thus allowing the operating efficiency of the compressor to be maintained.

According to the invention, a mixing ratio for the calcium fluoride of at least 0.05% by volume based on the fluorocarbon resin will allow its properties to be exhibited. In the coat layer 35 of the aforementioned embodiment the calcium fluoride is present at 0.1% by volume based on the fluorocarbon resin, which allows the properties of the calcium fluoride to be exhibited to ensure the above-mentioned sliding properties and wear resistance. If the mixing ratio of the calcium fluoride exceeds 12% by volume based on the fluorocarbon resin, the relative proportion of the fluorocarbon resin and binder in the coat layer will be reduced, which is undesirable in terms of the sliding properties, etc.

The proportion of the fluorocarbon resin and binder in the coat layer 35 is, in terms of weight, in the range of 50–400 parts by weight of the binder per 100 parts by weight of the fluorocarbon resin, thus guaranteeing a balance between the adhesive strength, wear resistance and sliding properties of the coat layer 35. If the binder proportion is lower, the adhesive strength of the coat layer 35 with respect to the piston will be reduced. If the binder proportion is higher, that is, if the fluorocarbon resin proportion is lower, the wear resistance and sliding properties will be reduced.

The present invention is not limited to these embodiments, and may also take the following concrete forms.

A substance other than calcium fluoride, such as zinc oxide, mica, aluminum hydroxide or the like, is used as the wear resistance additive, either alone or in combinations, or in admixture with calcium fluoride. The mixing proportions and particle sizes are according to the embodiments described above.

A substance with a different Mohs hardness is used as the wear resistance additive. For example, a substance with a Mohs hardness in the range of 2.5–4.5, or a substance with a Mohs hardness in the range of 3.0–4.0, is used. This still provides the effect of the embodiments described above. Naturally, this will still apply to cases where substances with different Mohs hardnesses are combined.

REFERENCE EXAMPLE 1

A coating solution was prepared comprising a fluorocarbon resin, a binder and calcium fluoride, and this was coated onto a substrate (the "disk" described below) and calcined at 180° C. for 90 minutes, after which the wear resistance was measured by the test method described below.

Coating solution composition

[1] Fluorine resin Polytetrafluoroethylene powder (mean particle size: 4 μm, bulk density: 280 ±80 g/L, production method: emulsion polymerization): 100 pts. by wt.

[2] Binder Polyamide-imide: HPC-5000 by Hitachi Chemical Co., Ltd. 160 pts. by wt. (as solid content)

[3] Solvent

| | |
|---|---|
| N-methylpyrrolidone | 340 pts. by wt. |
| xylene | 30 pts. by wt. |

[4] Calcium fluoride (mean particle size: 3 μm, Mohs hardness: 4.0) The relationship between the amount of addition (volume percent based on fluorocarbon resin) and the degree of wear was as follows.

| | | | | | | | | | |
|---|---|---|---|---|---|---|---|---|---|
| Calcium fluoride (vol%): | 0 | 0.05 | 0.3 | 1.0 | 3.0 | 5.0 | 8.0 | 12.0 | 15.0 |
| Wear (μm) | 10 | 2.0 | 1.0 | 0.5 | 0 | 0.5 | 1.0 | 2.0 | 8.0 |

Measurement method and conditions: The degree of wear was measured by pressure welding at 4 kg a ring onto a disk having a coat layer with a thickness of 30 μm and determining the wear depth of the coat layer after oilless rotation at 500 rpm for 20 hours.

REFERENCE EXAMPLE 2

A coat layer was formed in the same manner as Reference Example 1 except that the following wear resistance additives were used at 0.3% by volume instead of the 0.3% by volume of calcium fluoride in Reference Example 1; the degree of wear of the coat layer was measured in the same manner as Reference Example 1. The results are shown below together with the results for the 0.3% by volume of calcium fluoride.

| | Mohs hardness | Mean particle size (μm) | Degree of wear (μm) |
|---|---|---|---|
| Not added | | | 10 |
| Graphite (hexagonal) | 1.5 | 5.0 | 9 |
| Boron nitride (hexagonal) | 2.0 | 1.5 | 5 |
| Mica (monoclinical) | 2.5 | 3.0 | 3 |
| Aluminum hydroxide (hexagonal) | 3.0 | 1.0 | 2 |
| Calcium carbonate | 3.5 | 0.04 | 2 |
| Calcium fluoride (cubic) | 4.0 | 3.0 | 1 |
| Zinc oxide (hexagonal) | 4.5 | 0.6 | 2 |
| Calcium tertiary phosphate (amorphous) | 5.0 | 2.0 | 4 |

Examples

Coat layers (thickness: about 30 μm) containing graphite, mica, calcium fluoride or calcium tertiary phosphate were formed onto the outer perimeter side surfaces of double-head swash plate piston compressor pistons according to Reference Example 2, and were tested in an actual machine under the following conditions, giving the results shown below (FIG. 4).

Compressor: double-head swash plate piston compressor

Refrigerant/oil: R134/PAG

Rotation rate: 700 rpm

Operating time: 100 H

| Wear resistance additive (0.3 vol %) | Mohs hardness | Local wear ($\mu$m) |
|---|---|---|
| Graphite (hexagonal) | 1.5 | 13 |
| Mica (monoclinical) | 2.5 | 7 |
| Calcium fluoride (cubic) | 4.0 | 3 |
| Calcium tertiary phosphate (amorphous) | 5.0 | 8 |

In one case, the overall degree of wear is greater than in the above-mentioned test results but the value of the Mohs hardness was 1.5 even as measured at the local sections of the piston most prone to wear, while the other degrees of wear were low, and therefore the tendency for excellent wear resistance is still seen.

As demonstrated by these embodiments, the present invention exhibits the following effects.

According to the invention of claim 1, the wear resistance additive is contained at 0.05–12% by volume based on the fluorocarbon resin, and the wear resistance is thus improved while a satisfactory sealing property is ensured.

According to the invention of claim 2, a wear resistance additive with a Mohs hardness of 2.5–4.5 is used, and the wear resistance is thus improved.

According to the invention of claim 3, a wear resistance additive with a Mohs hardness of 3.0–4.0 is used, and the wear resistance is thus further improved.

According to the invention of claim 4, a wear resistance additive with a Mohs hardness of 4.0 is used, for maximum satisfactory wear resistance.

According to the invention of claim 5, a solid lubricant is used as the wear resistance additive, making it possible to reduce the sliding resistance acting on the piston in order to obtain satisfactory sliding properties.

According to the invention of claim 6, calcium fluoride is used which expresses a high level for both the Mohs hardness and the solid lubricating properties, thus making it possible to achieve very suitable wear resistance and sliding properties.

According to the invention of claim 7, the mean particle size of the calcium fluoride is no greater than 10 $\mu$m, so that the effect of claim 6 can be satisfactorily maintained.

What is claimed is:

1. A piston compressor piston having a coat layer provided on the outer perimeter side surface of the piston, which coat layer comprises a fluorocarbon resin and a binder at 50–400 parts by weight per 100 parts by weight of the fluorocarbon resin, and further contains a wear resistant additive with a Mohs hardness in a range of 2.0–5.0 at 0.05–12% by volume based on the fluorocarbon resin content.

2. A piston compressor piston according to claim 1, wherein the Mohs hardness of the wear resistance additive is in the range of 2.5–4.5.

3. A piston compressor piston according to claim 1, wherein the Mohs hardness of the wear resistance additive is in the range of 3.0–4.0.

4. A piston compressor piston according to claim 1, wherein the Mohs hardness of the wear resistance additive is 4.0.

5. A piston compressor piston according to claim 1, wherein the wear resistance additive has solid lubricating properties.

6. A piston compressor piston according to claim 1, wherein the wear resistance additive is calcium fluoride.

7. A piston compressor piston according to claim 1, wherein the wear resistance additive has a mean particle size of no greater than 10 $\mu$m.

8. A piston compressor piston according to claim 1, wherein the fluorocarbon resin is selected from the group consisting of polytetrafluoroethylene, ethylenetetrafluoroethylene, tetrafluoroethylene-hexafluoropropylene copolymer, and mixtures thereof.

9. A piston compressor piston according to claim 1, wherein the coat layer has a thickness of about 20 to about 60 $\mu$m.

* * * * *